United States Patent
Schmidt et al.

(10) Patent No.: US 7,580,784 B2
(45) Date of Patent: Aug. 25, 2009

(54) METHOD FOR ESTIMATING THE LONGITUDINAL INCLINATION OF A ROADWAY

(75) Inventors: Mario Schmidt, Freiberg (DE); Joerg Grieser, Kirchardt (DE)

(73) Assignee: Robert Bosch GmbH, Stuttgart (DE)

( * ) Notice: Subject to any disclaimer, the term of this patent is extended or adjusted under 35 U.S.C. 154(b) by 603 days.

(21) Appl. No.: 10/974,903

(22) Filed: Oct. 26, 2004

(65) Prior Publication Data

US 2005/0125107 A1 Jun. 9, 2005

(30) Foreign Application Priority Data

Oct. 30, 2003 (DE) ................. 103 50 782

(51) Int. Cl.
*G06F 7/70* (2006.01)
*B60T 8/58* (2006.01)

(52) U.S. Cl. ............... 701/70; 701/54; 701/84; 701/87; 477/114; 340/440; 303/199

(58) Field of Classification Search ........ 701/1, 701/70
See application file for complete search history.

(56) References Cited

U.S. PATENT DOCUMENTS

| | | | | |
|---|---|---|---|---|
| 5,132,906 A | * | 7/1992 | Sol et al. ............... | 701/80 |
| 5,703,776 A | * | 12/1997 | Soung ................ | 701/65 |
| 5,797,109 A | * | 8/1998 | Aminpour et al. ......... | 701/65 |
| 5,925,087 A | * | 7/1999 | Ohnishi et al. ............ | 701/70 |
| 6,510,374 B1 | * | 1/2003 | Saotome et al. ........... | 701/80 |
| 6,980,900 B2 | * | 12/2005 | Grieser ................ | 701/70 |
| 7,194,341 B2 | * | 3/2007 | Altenkirch ............. | 701/1 |
| 2003/0236606 A1 | * | 12/2003 | Lu et al. ............... | 701/70 |
| 2005/0065695 A1 | * | 3/2005 | Grieser ................ | 701/70 |

* cited by examiner

*Primary Examiner*—Thomas G Black
*Assistant Examiner*—Lin B Olsen
(74) *Attorney, Agent, or Firm*—Kenyon & Kenyon LLP

(57) ABSTRACT

A method and device for determining a longitudinal inclination variable representing the longitudinal inclination of a roadway, using a sensor "means" present in a motor vehicle, in which
  a first unbraked driving state of the vehicle and
  a second driving state of the motor vehicle in which at least one brake is actuated are considered; and
  as a function thereof the variable representing the longitudinal inclination of the roadway is determined.

7 Claims, 2 Drawing Sheets

METHOD FOR ESTIMATING THE LONGITUDINAL INCLINATION OF A ROADWAY

BACKGROUND INFORMATION

"Hill hold control" (HHC, or hill holder) is a system that frees the driver from operating the hand brake when the vehicle is set in motion. By locking in the brake pressure applied by the driver, this system prevents backward rolling of the vehicle from the time the brake pedal is released until the vehicle is actually set in motion. The engine torque necessary for setting the vehicle in motion is determined using the estimated roadway inclination. Currently existing estimations of inclination require a relatively high calibration effort. The estimation of inclination must be individually calibrated for each vehicle/engine variant.

SUMMARY OF THE INVENTION

The present invention improves not only the quality of the inclination estimation, but also requires no calibration effort. Using only the vehicle data and the sensor signals from the ESP (Electronic Stability Program), the present invention enables a relatively accurate estimation of the longitudinal inclination of a roadway. A further advantage of the present invention is that the error resulting from the difference between the actual and the recorded braking torque/brake pressure ratios (Cp) does not significantly affect the calculated inclination. In particular for wet conditions and old brake pads, this greatly improves the quality of the inclination calculation.

The present invention relates to a method for determining a longitudinal inclination variable representing the longitudinal inclination of a roadway, using sensor means present in a motor vehicle, in which a first unbraked driving state of the vehicle and
a second driving state of the motor vehicle in which at least one brake is actuated
are considered; and
as a function thereof the variable representing the longitudinal inclination of the roadway is determined.

The present invention allows a particularly simple determination of the longitudinal inclination of a roadway without the use of an inclination sensor. Of course, in special cases the longitudinal inclination may also be considered instead of the "longitudinal inclination variable representing the longitudinal inclination of a roadway."

One advantageous embodiment of the present invention is characterized in that a rough inclination variable representing a rough value for the roadway inclination is determined; and
the value of the longitudinal inclination variable is determined by adding a correction term to the rough inclination variable,
the correction term being determined by considering the first and second driving states.

According to the present invention, the correction term allows compensation to be made for any errors contained in the rough inclination variable.

One advantageous embodiment of the present invention is characterized in that in the first driving state a first difference between a vehicle longitudinal acceleration determined by means of a model and a vehicle longitudinal acceleration determined by evaluation of wheel speed sensor signals is determined;

in the second driving state a second difference between a vehicle longitudinal acceleration determined by means of a model and a vehicle longitudinal acceleration determined by evaluation of wheel speed sensor signals is determined; and the correction term is determined based on the first and second differences.

One advantageous embodiment of the present invention is characterized in that the difference between the second difference and the first difference is used in determining the correction term.

One advantageous embodiment of the present invention is characterized in that at least the wheel cylinder brake pressures and the drive torque of the vehicle are used in determining the vehicle longitudinal acceleration, which is determined in the first and second driving states using a model. It is now standard for these variables to be readily available in modern vehicles.

One advantageous embodiment of the present invention is characterized in that the first and second driving states are driving states which occur close to one another in time. This ensures that the roadway inclination is approximately the same for both driving states.

One advantageous embodiment of the present invention is characterized in that the rough inclination variable is determined at least from the wheel cylinder brake pressures, the drive torque of the vehicle, and the longitudinal acceleration of the vehicle determined using the output signals from the wheel speed sensors.

One advantageous embodiment of the present invention is characterized in that the longitudinal inclination variable is continuously determined during unbraked and braked driving states while keeping the correction term constant; and the correction term is redetermined and updated when a transition from a braked to an unbraked driving state occurs.

Since the correction term is physically determined by the very slowly changing variables which represent the ratio of the braking torque to the brake pressure, it is sufficient to recalculate the correction term when a transition from the braked to the unbraked state occurs.

The present invention further relates to a device for determining a longitudinal inclination variable representing the longitudinal inclination of a roadway, using sensor means present in a motor vehicle, which contain evaluation means in which a first unbraked driving state of the vehicle and a second driving state of the motor vehicle, in which at least one brake is actuated, are considered; and means for determining the longitudinal inclination, in which the variable representing the longitudinal inclination of the roadway is determined as a function of the output signals from the evaluation means.

The advantageous embodiments of the method according to the present invention naturally also find application as advantageous embodiments of the device according to the present invention, and vice versa.

DETAILED DESCRIPTION

An object of the present invention is to estimate the longitudinal inclination of a roadway using the signals and data available in the ESP. This requires practically no calibration effort, since the parameters used are obtained only from vehicle data. Based on the estimated longitudinal inclination of the roadway, the engine torque necessary for setting the vehicle in motion is determined.

The present invention enables the roadway inclination to be determined without calibration effort, using only the vehicle data. A further advantage of the present invention is that the error resulting from the difference between the actual and the recorded braking torque/brake pressure ratio (Cp) does not significantly affect the calculated inclination. In particular for wet conditions and old brake pads, this greatly improves the quality of the inclination calculation.

Figure 1:
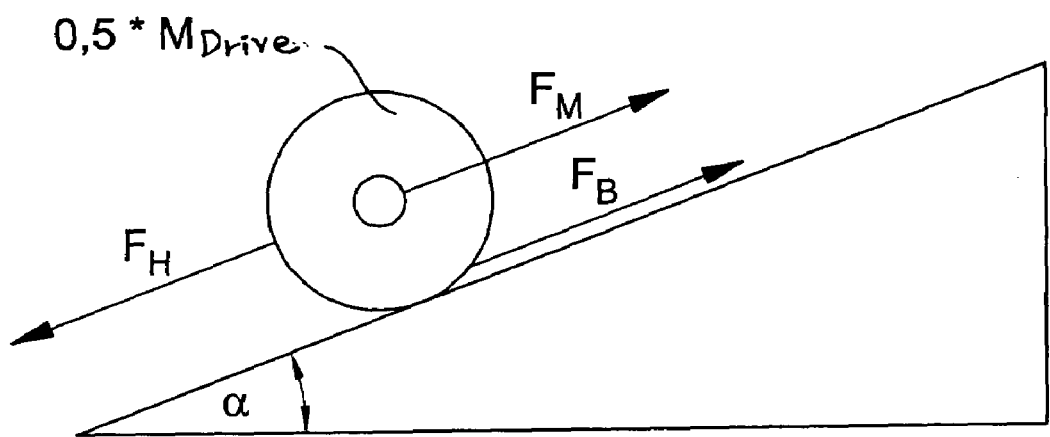
FIG. 1 shows the forces acting on the vehicle.

The roadway inclination may be determined from a balance of forces. The following forces or torques illustrated in FIG. 1 are used as inputs:

1. Downgrade force $F_H$:

$$F_H = m_F \cdot g \cdot \sin(\alpha)$$

where $m_F$ is the mass of the vehicle, g is the gravitational acceleration, and $\alpha$ is the angle of longitudinal inclination of the roadway.

2. Braking force $F_B$:

$$F_B = \frac{(pWheel_{LF} + pWheel_{RF}) \cdot Cp_{FA} + (pWheel_{LR} + pWheel_{RR}) \cdot Cp_{RA}}{r_{wheel} \cdot m_F}$$

where $pWheel_{LF}$, $pWheel_{RF}$, $pWheel_{LR}$, and $pWheel_{RR}$ are the wheel brake pressures in the left front wheel, right front wheel, left rear wheel, and right rear wheel, respectively. $CP_{FA}$ and $CP_{RA}$ are the ratios of the braking torque to the brake pressure on the front axle ($CP_{FA}$) and rear axle ($CP_{RA}$), respectively.

3. Inertial force $F_M$:

$$F_M = m_F \cdot a'_x$$

where $a'_x$ is the vehicle acceleration, filtered and corrected for errors. For this term the following applies:

$$a'_x = axToF - ax\text{Delta}$$

where axToF is the (filtered) vehicle acceleration determined from the wheel speed, and axDelta is a correction factor to be further explained below.

4. Engine drive torque $M_{drive}$:

This torque acts about the wheel center point, and results in the overall force ($M_{drive}/r_{wheel}$).

Thus, the following overall balance for all wheels is obtained:

$$F_H + F_M + F_B - \frac{M_{drive}}{r_{wheel}} = 0$$

$$F_H = -F_M - F_B + \frac{M_{drive}}{r_{wheel}}$$

$$\sin(\alpha) = \frac{-F_M - F_B + \frac{M_{drive}}{r_{wheel}}}{g \cdot m_F}$$

For small angles, $\sin(\alpha) = \tan(\alpha)$.

Thus, roadway inclination P in percent is obtained as follows:

$$P = \tan(\alpha) \cdot 100\%$$

or $$P\,[\%] = \frac{100}{g} \cdot \left( -a'_x - \frac{(pWheel_{LF} + pWheel_{RF}) \cdot Cp_{FA} + (pWheel_{LR} + pWheel_{RR}) \cdot CP_{RA}}{r_{wheel} \cdot m_F} + \frac{M_{drive}}{r_{wheel} \cdot m_F} \right)$$

The value of P determined using this relationship may be erroneous since input variables $CP_{FA}$ and $CP_{RA}$ are not precisely known. Therefore, variable $a'_x$ is not the physical vehicle acceleration (i.e., actually present or measurable by an external observer), but, rather, $a'_x$ represents a corrected vehicle acceleration. $a'_x$ is corrected with respect to vehicle longitudinal acceleration axToF actually present, by the value resulting from the incorrect or inaccurate values of $CP_{FA}$ and $CP_{RA}$; i.e., the error resulting from the incorrect or inaccurate values of $CP_{FA}$ and $CP_{RA}$ in the calculation of P is compensated for by the use of $a'_x$ instead of axToF.

The inclination is determined in the following steps:

Step 1:

An unbraked operating state of the vehicle is considered. In this operating state a longitudinal acceleration of the vehicle is determined based on a balance of forces, using a simple force model. This model is based on a flat roadway, i.e., assumes (possibly incorrectly) that a flat roadway is present.

At the same time, the longitudinal acceleration of the vehicle is determined based on an evaluation of the output signals from the wheel speed sensors. The difference between these two values is denoted as axToOff.

A value of axToOff different from zero may have essentially two different causes:

Cause 1: A roadway inclination that is different from zero.
Cause 2: Insufficiently accurate knowledge of values CPFA and CPRA.

Additional causes, such as for example modeling inaccuracies, may be disregarded compared to the two cited causes. Since in step 1 an unbraked operating state of the vehicle is considered, cause 2 does not play a role: a value of axToOff different from zero may be attributed essentially to a roadway inclination that is different from zero. The value of axToOff determined in step 1 is denoted as axToOffMerk.

The expression given for P[%], for example, is a suitable model by setting P=0 and then solving this expression for $a'_x$. Value $a'_x$ thus determined represents the longitudinal acceleration of the vehicle determined using the P[%] model.

Step 2:

Immediately following step 1 (for example, within a time period of 20 milliseconds following step 1) a braked operating state of the vehicle is considered. It is assumed that the roadway inclination has not changed, i.e., that the roadway inclination is the same for both steps 1 and 2. As in step 1, the longitudinal acceleration of the vehicle is again determined in step 2, using the same model, and at the same time the longitudinal acceleration of the vehicle is also determined from the wheel speeds. The difference between these two values is again denoted as axToOff.

The difference between axToOff and axToOffMerk is now determined:

axDelta=axToOff−axToOffMerk.

Since it is assumed that the inclination has not changed (i.e., cause 1 is absent), a value of axDelta that is different from zero must necessarily originate from insufficiently accurate values for $CP_{FA}$ and $CP_{RA}$ (i.e., cause 2).

Step 3:

The vehicle acceleration determined using the wheel speed sensors is corrected by value axDelta, which yields $a'_x$=axToF−axDelta.

Step 4:

Using the relationship derived above, $$P\,[\%] = \frac{100}{g} \cdot \left( -a'_x - \frac{(pWheel_{LF}+pWheel_{RF})\cdot Cp_{FA} + (pWheel_{LR}+pWheel_{RR})\cdot CP_{RA}}{r_{wheel}\cdot m_F} + \frac{M_{drive}}{r_{wheel}\cdot m_F} \right),$$

roadway inclination P (value in %) is now determined. The error originating from the inaccuracy of $CP_{FA}$ and $CPR_A$ has been corrected by using $a'_x$, instead of axToF.

Based on the continuously determined values of axToF, $pWheel_{LF}$, $pWheel_{RF}$, $pWheel_{LR}$, and $pWheel_{RR}$, as well as $M_{drive}$, the inclination may be continuously updated. Correction variable axDelta used in computing $a'_x$ is maintained until an unbraked driving state is again present. Step 1 of the described method is then repeated. Each transition from an unbraked to a braked driving state, therefore, may be used for updating or redetermining variable axDelta.

Vehicle longitudinal acceleration axToF determined using the wheel speed sensors is advantageously a variable filtered by a low-pass filter; i.e., high-frequency fluctuations appearing in the output signals from the wheel speed sensors are filtered out.

Filtered variable axToF may be obtained from unfiltered output signals axTo from the wheel speed sensors, for example by the following iterative filtering instruction:

axTof[k+1]=axToF[k]+(axTo[k+1]−axToF[k])*FilFactor.

Values [k+1] and [k] in brackets denote the iteration step (and therefore also the time), and FilFactor represents the filter factor, where FilFactor=1 when the confidence level for the unfiltered output signals from the wheel speed sensors is high (for example, travel is straight ahead on a flat, non-slippery roadway at moderate speed); and FilFactor=0 when the unfiltered output signals from the wheel speed sensors are most likely unrepresentative of the longitudinal speed of the vehicle (for example, ABS or ASR control or strong transverse acceleration are present).

The limiting case FilFactor=1 results in axTof[k+1]=axTo[k+1] (i.e., the unfiltered signals are completely accepted), and the limiting case FilFactor=0 results in axTof [k+1]=axToF [k] (i.e., the unfiltered signals are disregarded). Of course, FilFactor may assume any value between 0 and 1, and not just limiting values 0 and 1.

The calculated inclination is also filtered, analogously to the above-described filtering of the wheel speed sensors. The calculated value of P, depending on the driving situation, is filtered more or less strongly. The lower the confidence level for the calculated value in the particular driving situation, the smaller the filter factor. The unfiltered value of the inclination is denoted as P, the filtered inclination value is denoted as Pf, and the arguments or indices [k+1] or [k] denote the iteration step (or time step).

Pf[k+1]=Pf[k]+(P[k+1]−Pf[k]) *FilFactor.

When the pressure change per unit time |dp/dt| is greater than a threshold value for all wheels, a very strong filtering is performed; i.e., filter factor FilFactor is very small or zero. When the vehicle is traveling slowly, strong filtering is performed and FilFactor assumes a small value. When the vehicle is at a standstill, there is no updating of the calculated inclination; i.e., FilFactor assumes a large value with a maximum of 1. The filtered estimated inclination is calculated only when no more than one wheel is slipping, during ABS control when not all wheels are slipping.

Figure 2:
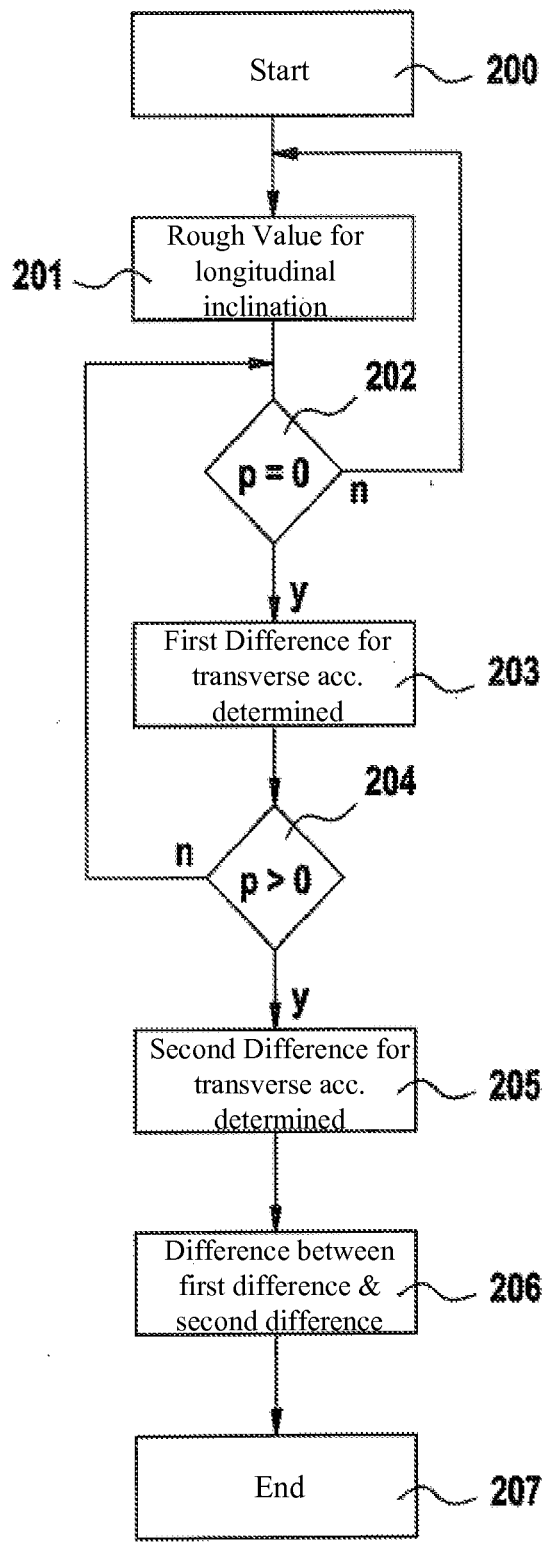
FIG. 2 shows the sequence of one embodiment of the method according to the present invention.

The sequence for one embodiment of the method according to the present invention is illustrated in FIG. 2. After the start in block 200, a rough value for the longitudinal inclination of the roadway is determined in block 201. A query is then made in block 202 as to whether the brake pressure is zero on all wheels (i.e., the vehicle is unbraked). If the response is "no" (identified by "n" in block 202), the sequence returns to the input of block 201. If the answer is "yes," however, the sequence continues to block 203. A first difference between a transverse acceleration determined using a model and a transverse acceleration determined from the wheel speeds is generated in block 203. A query is then made in block 204 as to whether the brake pressure in at least one wheel brake cylinder is greater than zero. If this is not the case, the sequence returns to the input of block 202. If the response is "yes," a second difference between a transverse acceleration determined using a model and a transverse acceleration determined from the wheel speeds is generated in block 205.

The difference between the first difference and the second difference is then generated in block 206. This forms the correction term for the longitudinal inclination of the roadway which is added to the rough value determined in block 201. The method according to the present invention ends in block 207. Alternatively, a return to block 201 is conceivable, and the longitudinal inclination value determined in block 206 is considered as a new rough value and is updated again at the time of the next transition from an unbraked to a braked state.

What is claimed is:

1. A method for determining a longitudinal inclination variable representing a longitudinal inclination of a roadway, using a sensor arrangement situated in a motor vehicle, the method comprising:

determining the variable representing the longitudinal inclination of the roadway as a function of a first unbraked driving state of the vehicle;

determining the variable representing longitudinal inclination of a second driving state of the vehicle in which at least one brake is actuated;

in the first driving state, determining a first difference between a vehicle longitudinal acceleration determined by a model and a vehicle longitudinal acceleration determined by evaluating wheel speed sensor signals;

in the second driving state, determining a second difference between a vehicle longitudinal acceleration determined by a model and a vehicle longitudinal acceleration determined by evaluating wheel speed sensor signals;

in the second driving state, determining a second difference between a vehicle longitudinal acceleration determined by a model and a vehicle longitudinal acceleration determined by evaluating wheel speed sensor signals;

determining a correction term as a function of the first and second differences;

determining a rough inclination variable representing a rough value of the longitudinal inclination of the roadway;

determining a value of the longitudinal inclination variable by adding a correction term to the rough inclination variable; and determining the correction terms as a function of the first and second driving states.

2. The method according to claim 1, wherein the rough inclination variable is determined at least from wheel cylinder brake pressures, a drive torque of the vehicle, and a longitudinal acceleration of the vehicle determined using output signals from wheel speed sensors.

3. The method according to claim 1, further comprising:
continuously determining the longitudinal inclination variable during unbraked and braked driving states while keeping the correction term constant; and
redetermining and updating the correction term when a transition from a braked to an unbraked driving state occurs.

4. A method for determining a longitudinal inclination variable representing a longitudinal inclination of a roadway, using a sensor arrangement situated in a motor vehicle, the method comprising:

determining the variable representing the longitudinal inclination of the roadway as a function of a first unbraked driving state of the vehicle;

determining the variable representing the longitudinal inclination of a second driving state of the vehicle in which at least one brake is actuated;

in the first driving state, determining a first difference between a vehicle longitudinal acceleration determined by a model and a vehicle longitudinal acceleration determined by evaluating wheel speed sensor signals;

in the second driving state, determining a second difference between a vehicle longitudinal acceleration determined by a model and a vehicle longitudinal acceleration determined by evaluating wheel speed sensor signals;

determining a correction term as a function of the first and second differences; and using a difference between the second difference and the first difference in determining the correction term.

5. A method for determining a longitudinal inclination variable representing a longitudinal inclination of a roadway, using a sensor arrangement situated in a motor vehicle, the method comprising:

determining the variable representing the longitudinal inclination of the roadway as a function of a first unbraked driving state of the vehicle;

determining the variable representing the longitudinal inclination of a second driving state of the vehicle in which at least one brake is actuated;

in the first driving state, determining a first difference between a vehicle longitudinal acceleration determined by a model and a vehicle longitudinal acceleration determined by evaluating wheel speed sensor signals;

in the second driving state, determining a second difference between a vehicle longitudinal acceleration determined by a model and a vehicle longitudinal acceleration determined by evaluating wheel speed sensor signals;

determining a correction term as a function of the first and second differences; and using at least wheel cylinder brake pressure and a drive torque of the vehicle in determining a longitudinal acceleration of the vehicle in the first and second driving states, using a model.

6. A method for determining a longitudinal inclination variable representing a longitudinal inclination of a roadway, using a sensor arrangement situated in a motor vehicle, the method comprising:

determining the variable representing the longitudinal inclination of the roadway as a function of a first unbraked driving state of the vehicle;

determining the variable representing the longitudinal inclination of a second driving state of the vehicle in which at least one brake is actuated;

in the first driving state, determining a first difference between a vehicle longitudinal acceleration determined by a model and a vehicle longitudinal acceleration determined by evaluating wheel speed sensor signals;

in the second driving state, determining a second difference between a vehicle longitudinal acceleration determined by a model and a vehicle longitudinal acceleration determined by evaluating wheel speed sensor signals; and determining a correction term as a function of the first and second differences;

wherein the first and second driving states are driving states which occur close to one another in time.

7. A device for determining a longitudinal inclination variable representing a longitudinal inclination of a roadway, using a sensor arrangement situated in a motor vehicle, the device comprising:

an evaluation device in which a first unbraked driving state of the vehicle and a second driving state of the vehicle, in which at least one brake is actuated, are considered;

an arrangement for determining the longitudinal inclination, in which the variable representing the longitudinal inclination of the roadway is determined as a function of output signals from the evaluation device and, in the first driving state, for determining a first difference between a vehicle longitudinal acceleration determined by a model and a vehicle longitudinal acceleration determined by evaluating wheel speed sensor signals, and in the second driving state, for determining a second difference between a vehicle longitudinal acceleration determined by a model and a vehicle longitudinal acceleration determined by evaluating wheel speed sensor signals, and for determining a correction term as a function of the first and second differences.

* * * * *

UNITED STATES PATENT AND TRADEMARK OFFICE
CERTIFICATE OF CORRECTION

PATENT NO. : 7,580,784 B2 Page 1 of 1
APPLICATION NO. : 10/974903
DATED : August 25, 2009
INVENTOR(S) : Schmidt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1164 days.

Signed and Sealed this

Fourteenth Day of September, 2010

David J. Kappos
*Director of the United States Patent and Trademark Office*